United States Patent
O'Connor et al.

(10) Patent No.: US 7,643,011 B2
(45) Date of Patent: Jan. 5, 2010

(54) NOISE DETECTION IN MULTI-TOUCH SENSORS

(75) Inventors: Sean Erik O'Connor, Palo Alto, CA (US); Wayne Carl Westerman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 526 days.

(21) Appl. No.: 11/619,584

(22) Filed: Jan. 3, 2007

(65) Prior Publication Data
US 2008/0158169 A1      Jul. 3, 2008

(51) Int. Cl.
*G06F 3/041*      (2006.01)

(52) U.S. Cl. ...................................... 345/173; 345/156

(58) Field of Classification Search ......... 345/156–173, 345/174–179; 715/701, 811; 178/18.01–18.04, 178/18.05
See application file for complete search history.

(56) References Cited

U.S. PATENT DOCUMENTS

| | | | | |
|---|---|---|---|---|
| 6,373,474 B1 * | 4/2002 | Katabami | ................... | 345/173 |
| 6,476,798 B1 * | 11/2002 | Bertram et al. | ............. | 345/174 |
| 6,734,843 B2 * | 5/2004 | Bertram et al. | ............. | 345/173 |
| 7,254,775 B2 * | 8/2007 | Geaghan et al. | ............. | 715/701 |
| 7,411,581 B2 * | 8/2008 | Hardie-Bick | ................. | 345/173 |
| 2003/0210235 A1 * | 11/2003 | Roberts | ...................... | 345/173 |
| 2004/0056845 A1 * | 3/2004 | Harkcom et al. | ............ | 345/173 |
| 2005/0146513 A1 * | 7/2005 | Hill et al. | ..................... | 345/173 |
| 2005/0183035 A1 * | 8/2005 | Ringel et al. | ................ | 715/811 |
| 2007/0262966 A1 * | 11/2007 | Nishimura et al. | .......... | 345/173 |
| 2008/0024456 A1 * | 1/2008 | Peng et al. | ................... | 345/173 |
| 2008/0218494 A1 * | 9/2008 | Perski et al. | ................ | 345/174 |

* cited by examiner

*Primary Examiner*—Nitin Patel
(74) *Attorney, Agent, or Firm*—Morrison & Foerster LLP

(57) ABSTRACT

Multi-touch touch-sensing devices and methods are described herein. The touch sensing devices can include multiple sense points, each of which can be stimulated with a plurality of periodic waveforms having different frequencies to measure a touch value at the sense point. Noise at one or more of the frequencies can interfere with this measurement. Therefore, various noise detection (and rejection) techniques are described. The noise detection techniques include two-clean-frequency noise detection, one-clean-frequency noise rejection, and combined two-clean-frequency/one-clean-frequency noise detection. Each of the noise detection techniques can include statistical analyses of the sample values obtained. The touch sensing methods and devices can be incorporated into interfaces for a variety of electronic devices such as a desktop, tablet, notebook, and handheld computers, personal digital assistants, media players, and mobile telephones.

70 Claims, 8 Drawing Sheets

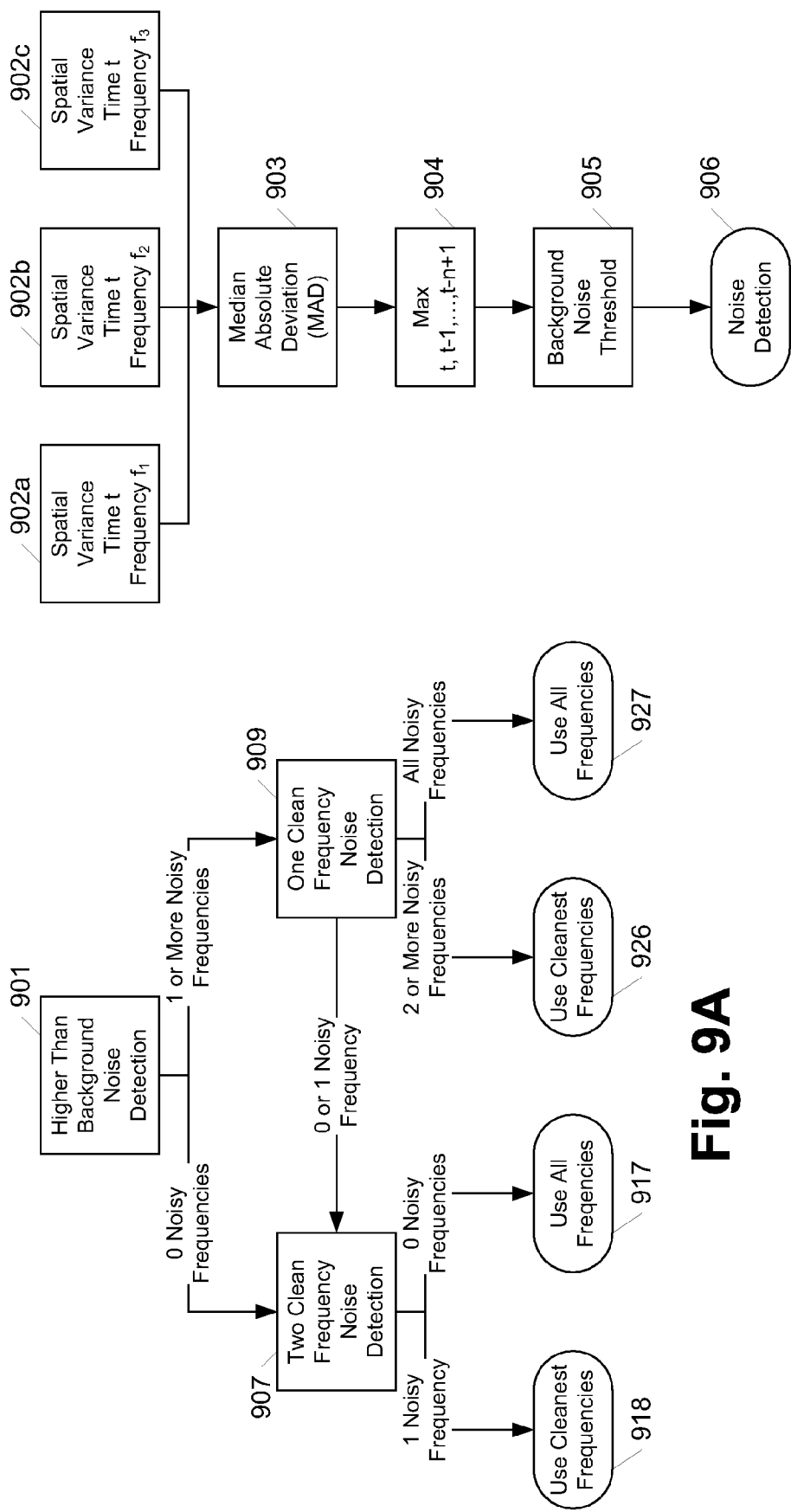

NOISE DETECTION IN MULTI-TOUCH SENSORS

CROSS-REFERENCE TO RELATED APPLICATIONS

This is related to the following U.S. Patents and Patent Applications, each of which is hereby incorporated by reference in its entirety:

U.S. Pat. No. 6,323,846, titled "Method and Apparatus for Integrating Manual Input," issued Nov. 27, 2001;

U.S. patent application Ser. No. 10/840,862, titled "Multipoint Touchscreen," filed May 6, 2004;

U.S. patent application Ser. No. 11/381,313, titled "Multipoint Touch Surface Controller," filed May 2, 2006.

U.S. patent application Ser. No. 11/619,433, titled "Simultaneous Sensing Arrangement," filed Jan. 3, 2007.

U.S. patent application Ser. No. 11/619,464 titled "Multi-Touch Input Discrimination," filed Jan. 3, 2007.

BACKGROUND

Recently, interest has developed in touch and/or proximity-based input systems for electronic devices and computer systems that are capable of recognizing multiple touch and/or hover events simultaneously. Many of these systems, for example those based on mutual capacitance or certain optical sensing arrangements, involve applying periodic stimulus waveforms to a plurality of sense points and detecting sense waveforms that can be related to the periodic stimulus waveform by the amount of touch and/or proximity present at the sense point. In some conventional embodiments, multiple separate stimulus waveforms, each having a unique stimulus frequency, were applied to the sense points. This allowed for a form of noise rejection.

Conventionally, noise rejection was accomplished by a variety of techniques involving combining sample values obtained at each sense point at each of the multiple stimulus frequencies. For example, a simple average (i.e., mean) of the sample values could be taken. The mean of all values can have a very high signal to noise ratio (SNR) in relatively low-noise environments. Alternatives to the mean of all values included weighted mean, median, mode, majority vote, and other parametric and robust statistical measures. While these various other statistical measures resist degradation in the presence of noise, each still can be substantially impaired by noise on one or more channels.

SUMMARY

In one embodiment, the invention can relate to a two-clean-frequency noise detection method. This can be a method of detecting noise in one or more of at least three touch images, where at least two touch images are noise free. Each touch image can comprise a plurality of touch sample values obtained by stimulating a touch sensor at a unique frequency. The method can include determining a mismatch of sample values obtained at each pair of frequencies. The mismatch can be determined as a sum of variances of sample values obtained at each pair of frequencies. The method can further include comparing the mismatches (variances) to identify one or more noisy frequencies, and, if one or more noisy frequencies is identified, computing a touch value as a function of sample values obtained at frequencies other than the identified noisy frequencies. Determining the variances between sample values obtained at each pair of frequencies can include subtracting values obtained at a first frequency from values obtained at a second frequency, summing and squaring over a plurality of touch image sensors. Identifying a noisy frequency can include comparing the variances to a predetermined threshold, which can be adaptive.

In a variation of this embodiment, comparing the variances can include computing a variance corresponding to each frequency pair and performing an analysis of variance on the computed variances. Performing an analysis of variance on the computed variances can include identifying a minimum variance, computing ratios of each variance to the minimum variance, and comparing the variance ratios to a threshold, which can be determined from a statistical test, such as an F-test or Levine's test.

In another embodiment, the invention can relate to a one-clean-frequency noise detection method. This can be a method of detecting noise in one or more of at least two touch images, where at least one touch image is noise free, each touch image comprising a plurality of touch sample values obtained by stimulating a touch sensor at a unique frequency. The method can include computing a smoothed image corresponding to the touch images (which each correspond to a particular stimulus frequency). The method can further include computing a high pass image corresponding to each frequency from the touch image at each frequency and the smoothed image at each frequency. This can be performed, for example, by subtracting the smoothed image from the touch image. The method can further include computing a spatial variance for each frequency from the high pass images, wherein the spatial variance can be representative of noise energy in each of the high pass images (and thus at each frequency). The method can further include computing a temporal variance from the spatial variances, which can be representative of noise energy for each frequency as a function of time. The method can also include comparing the computed temporal variances for each frequency to identify a noisy frequency.

If no noisy frequencies are identified, the method can include computing a touch value as a function of sample values obtained at all frequencies. If one or more noisy frequencies are identified, the method can include computing a touch value as a function of sample values obtained at all frequencies other than the one or more noisy frequencies. If all frequencies are identified as noisy, the method can include computing a touch value as a function of sample values obtained at all frequencies.

In the one-clean-frequency noise detection method, the smoothed images can be computed by performing an unsharp mask on a corresponding touch image. Furthermore, the temporal variance can be directly related to the length of a curve of a plot of spatial variances as a function of time. Additionally, comparing the computed temporal variances for each frequency can include performing an analysis of variance on the temporal variances. Performing an analysis of variance can include, for example, identifying a minimum temporal variance for each frequency, computing variance ratios of the temporal variances for each frequency to the minimum temporal variance, and comparing the computed variance ratios to a threshold determined from a statistical test, such as an F-test. The one-clean-frequency noise detection method can also include computing a quietness value as a function of the computed spatial variances and comparing the quietness value to a predetermined threshold to determine whether there is low noise on all frequencies.

In still another embodiment, the invention can relate to a noise detection method that combines one or more aspects of the two-clean-frequency noise detection method with one or more aspects of the one-clean-frequency noise detection method. This method can include determining whether noise in any of the touch images exceeds a background noise level. If not, the method can include performing a two-clean-frequency noise detection method, for example, one like those described above. If so, the method can include performing a one-clean-frequency noise detection method, for example, one like those described above.

In other embodiments, the invention can relate to a touch sensing device including a touch-sensitive surface having a plurality of touch sensors, drive circuitry configured to apply drive signals including at least three periodic waveforms of different frequencies to the touch sensors, sense circuitry configured to derive a touch image for each frequency, and additional circuitry configured to detect noise in one or more of the touch images by a variety of methods, including, for example, one or more of the methods described above. The touch sensors can be, for example, capacitive touch sensors. Other types of touch sensors can also be used. The touch-sensitive surface can also be part of a touch screen.

In still other embodiments, the invention can relate to an electronic device incorporating a touch sensing device, for example, like that above. The electronic device can take a variety of forms, including, for example, a desktop computer, a tablet computer, a notebook computer, a handheld computer, a personal digital assistant, a media player, and a mobile telephone. Additionally, the electronic device may be an integrated device including one or more of these functionalities.

BRIEF DESCRIPTION OF THE DRAWINGS

The aforementioned and other aspects of the invention may best be understood by reference to the following description taken in conjunction with the accompanying drawings in which:

FIG. 4 illustrates a process for operating a multi-touch sensing device in accordance with an embodiment of the present invention.

FIG. 9A illustrates a flow chart of an overview of a combined two-clean-frequency/one-clean-frequency noise detection algorithm in accordance with an embodiment of the present invention.

FIG. 9B illustrates a flow chart of a higher than background noise detection portion of a combined two-clean-frequency/ one-clean-frequency noise detection algorithm in accordance with an embodiment of the present invention.

DETAILED DESCRIPTION

Figure 1:
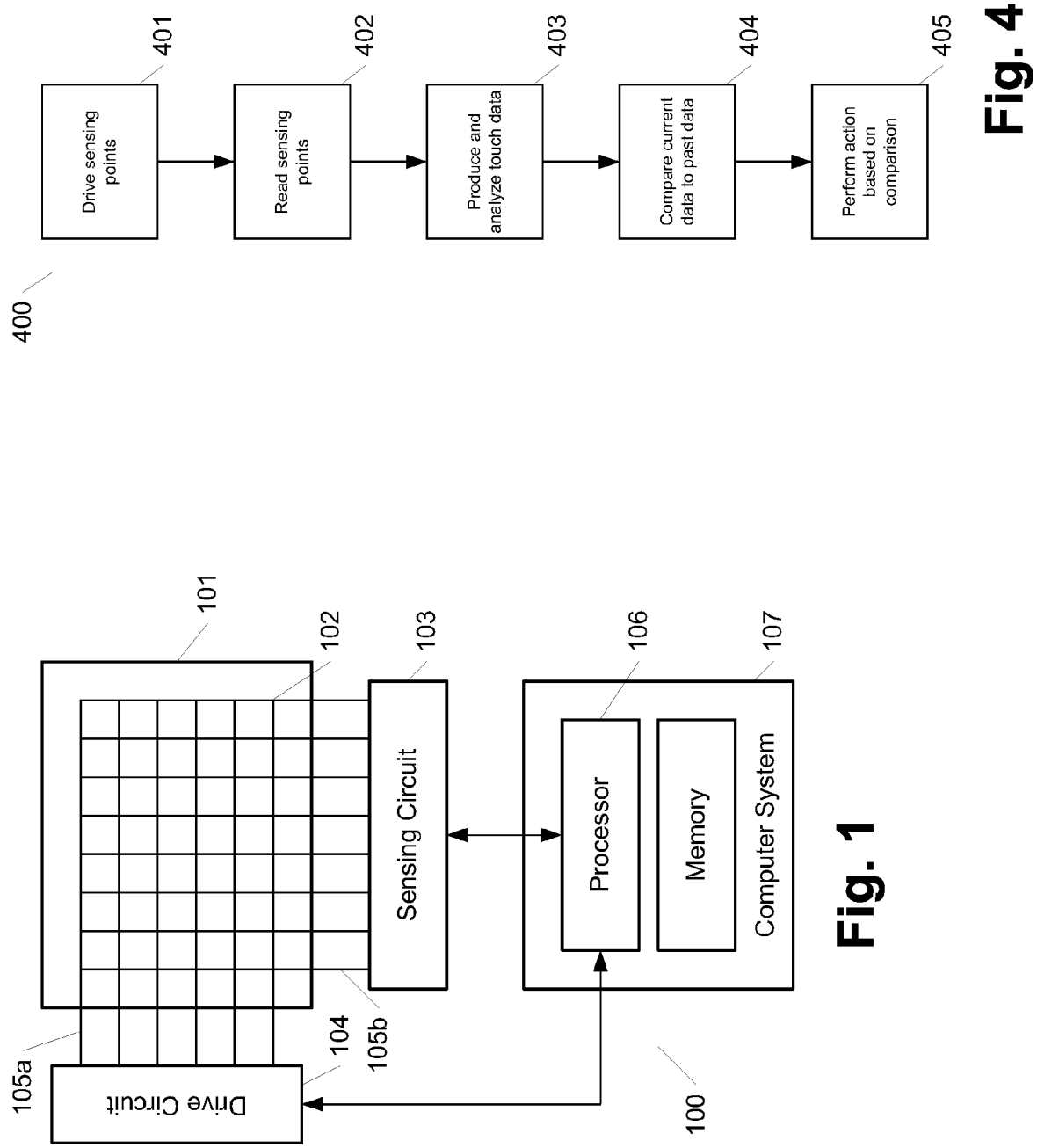
FIG. 1 illustrates a multi-touch sensing device used as an input device to a computer system in accordance with an embodiment of the present invention.

Recognizing multiple simultaneous or near-simultaneous touch events may be accomplished with a multi-touch sensing arrangement as illustrated in FIG. 1. Multi-touch sensing arrangement 100 can detect and monitor multiple touch attributes (including, for example, identification, position, velocity, size, shape, and magnitude) across touch sensitive surface 101, at the same time, nearly the same time, at different times, or over a period of time. Touch sensitive surface 101 can provide a plurality of sensor points, coordinates, or nodes 102 that function substantially independently of one another and that represent different points on a touch sensitive surface. Sensing points 102 may be positioned in a grid or a pixel array, with each sensing point capable of generating a signal at the same time. Sensing points 102 may be considered as mapping touch sensitive surface 101 into a coordinate system, for example, a Cartesian or polar coordinate system.

A touch sensitive surface may, for example, be in the form of a tablet or a touch screen. To produce a touch screen, the capacitance sensing points and other associated electrical structures can be formed with a substantially transparent conductive medium, such as indium tin oxide (ITO). The number and configuration of sensing points 102 may be varied. The number of sensing points 102 generally depends on the desired resolution and sensitivity. In touch-screen applications, the number of sensing points 102 may also depend on the desired transparency of the touch screen.

Figure 2:
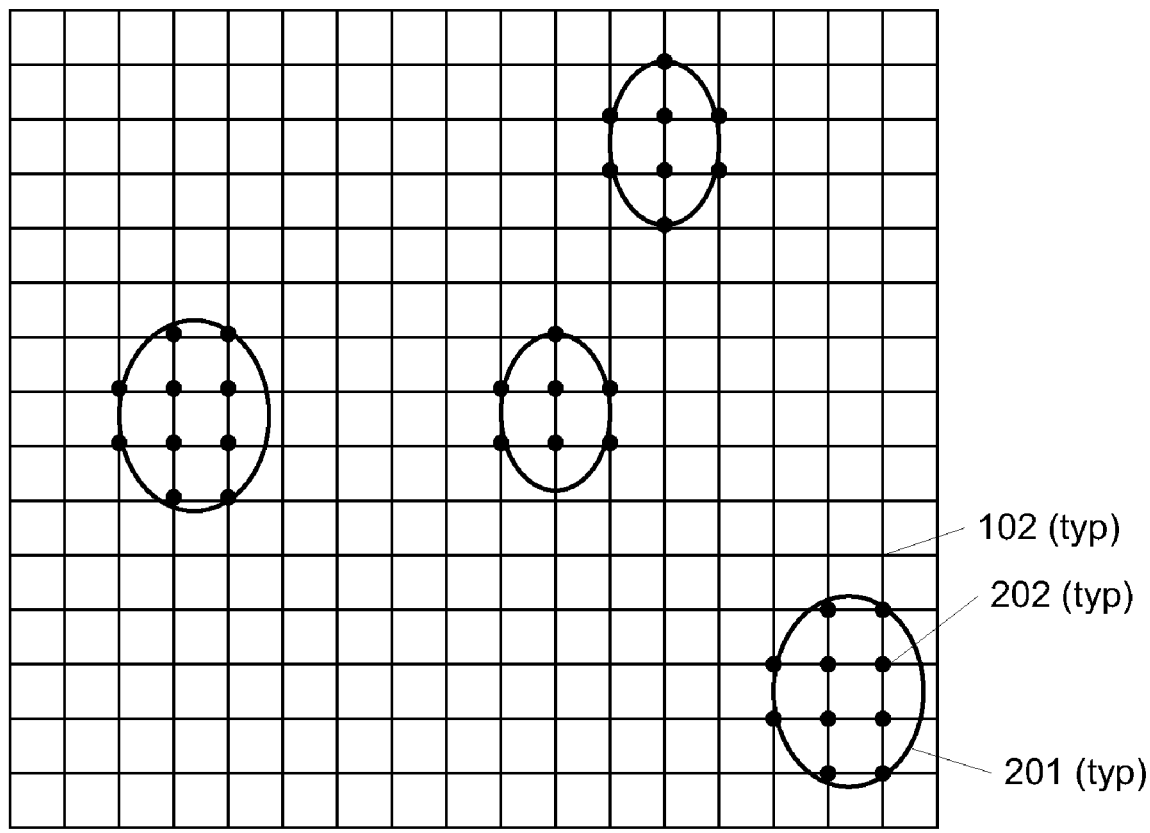
FIG. 2 illustrates a plurality of contact patch areas corresponding to an object in proximity to a plurality of sense points of a multi-touch surface in accordance with an embodiment of the present invention.

Using a multi-touch sensing arrangement, like that described in greater detail below, signals generated at nodes 102 of multi-touch sensor 101 may be used to produce an image of the touches at a particular point in time. For example, each object (e.g., finger, stylus, etc.) in contact with or in proximity to touch sensitive surface 101 can produce contact patch area 201, as illustrated in FIG. 2. Each of contact patch area 201 may cover several nodes 102. Covered nodes 202 may detect the object, while remaining nodes 102 do not. As a result, a pixilated image of the touch surface plane (which may be referred to as a touch image, a multi-touch image, or a proximity image) can be formed. The signals for each contact patch area 201 may be grouped together. Each contact patch area 201 may include high and low points based on the amount of touch at each point. The shape of contact patch area 201, as well as the high and low points within the image, may be used to differentiate contact patch areas 201 that are in close proximity to one another. Furthermore, the current image can be compared to previous images to determine how the objects may be moving over time, and what corresponding action should be performed in a host device as a result thereof.

Many different sensing technologies can be used in conjunction with these sensing arrangements, including resistive, capacitive, optical, etc. In capacitance-based sensing arrangements, as an object approaches touch-sensitive surface 101, a small capacitance forms between the object and sensing points 102 in proximity to the object. By detecting changes in capacitance at each of the sensing points 102 caused by this small capacitance, and by noting the position of the sensing points, a sensing circuit 103 can detect and monitor multiple touches. The capacitive sensing nodes may be based on self capacitance or mutual capacitance.

In self capacitance systems, the "self" capacitance of a sensing point is measured relative to some reference, e.g., ground. Sensing points 102 may be spatially separated electrodes. These electrodes are coupled to driving circuitry 104 and sensing circuitry 103 by conductive traces 105a (drive lines) and 105b (sense lines). In some self-capacitance embodiments, a single conductive trace to each electrode may be used as both a drive and sense line.

In mutual capacitance systems, the "mutual" capacitance between a first electrode and a second electrode can be measured. In mutual capacitance sensing arrangements, the sensing points may be formed by the crossings of patterned conductors forming spatially separated lines. For example, driving lines 105a may be formed on a first layer and sensing lines 105b may be formed on a second layer 105b such that the drive and sense lines cross or "intersect" one another at sensing points 102. The different layers may be different substrates, different sides of the same substrate, or the same side of a substrate with some dielectric separation. Alternatively, driving lines and sensing lines may be formed on the same layer of a substrate in proximity to each other but remain spatially separated. In either case, because the drive and sense lines are separated, there can be a capacitive coupling node at each "intersection," i.e., place where drive and sense lines come sufficiently close together.

The manner in which the drive and sense lines are arranged may vary. For example, in a Cartesian coordinate system (as illustrated), the drive lines may be formed as horizontal rows, while the sense lines may be formed as vertical columns (or vice versa), thus forming a plurality of nodes that may be considered as having distinct x and y coordinates. Alternatively, in a polar coordinate system, the sense lines may be a plurality of concentric circles with the drive lines being radially extending lines (or vice versa), thus forming a plurality of nodes that may be considered as having distinct r and angle coordinates. In either case, drive lines 105a may be connected to drive circuit 104, and sensing lines 105b may be connected to sensing circuit 103.

During operation, a drive signal (e.g., a periodic voltage) is applied to each drive line 105a by drive circuit 104. To improve noise susceptibility of the system, some embodiments may stimulate each drive line 105a with multiple drive signals, each having a different frequency. Sense results can be obtained for each frequency and analyzed and compared, as described in greater detail below. Noise sources may often affect some but not all of these different frequencies, and thus sense results obtained from relatively noise free stimulus frequencies may be used for touch sensing, as described in greater detail below.

When driven, the charge impressed on drive line 105a can capacitively couple to the intersecting sense lines 105b through nodes 102. This can cause a detectable, measurable current and/or voltage in sense lines 105b. The relationship between the drive signal and the signal appearing on sense lines 105b is a function of the capacitance coupling the drive and sense lines, which, as noted above, may be affected by an object in proximity to node 102. Capacitance sensing circuit (or circuits) 103 may sense sensing lines 105b and may determine the capacitance at each node as described in greater detail below.

Drive lines 105a may be driven one at a time, while the other drive lines held at a constant DC level (e.g., ground). This process can be repeated for each drive line 105a until all the drive lines have been driven, and a touch image (based on capacitance) can be built from the sensed results. Once all the lines 105a had been driven, the sequence would repeat to build a series of touch images. Alternatively, multiple drive lines may be driven simultaneously or nearly simultaneously, as described, in U.S. patent application Ser. No. 11/619,433, titled "Simultaneous Sensing Arrangement," filed Jan. 3, 2007, which is hereby incorporated by reference.

Figure 3:
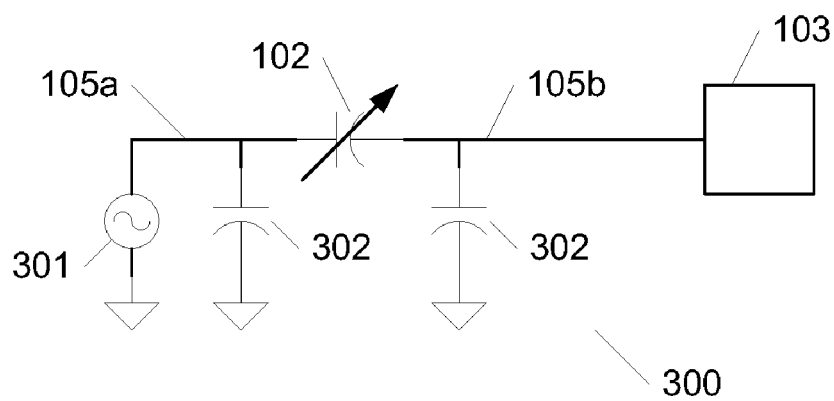
FIG. 3 illustrates a simplified schematic diagram of a mutual capacitance sensing circuit that may be used in an embodiment of the present invention.

FIG. 3 illustrates a simplified schematic diagram of mutual capacitance circuit 300 corresponding to the arrangement described above. Mutual capacitance circuit 300 may include drive line 105a and sense line 105b, which are spatially separated thereby forming capacitive coupling node 102. Drive line 105a may be electrically (i.e., conductively) coupled to drive circuit 104 represented by voltage source 301. Sense line 105b may be electrically coupled to capacitive sensing circuit 103. Both drive line 105a and sense line 105b may, in some cases, include some parasitic capacitance 302.

As noted above, in the absence of a conductive object proximate the intersection of drive line 105a and sense line 105b, the capacitive coupling at node 102 stays fairly constant. However, if an electrically conductive object (for example, a user's finger, stylus, etc.) comes in proximity to node 102, the capacitive coupling (i.e., the capacitance of the local system) changes. The change in capacitive coupling changes the current (and/or voltage) carried by sense line 105b. Capacitance sensing circuit 103 may note the capacitance change and the position of node 102 and report this information in some form to processor 106 (FIG. 1).

With reference to FIG. 1, sensing circuit 103 may acquire data from touch surface 101 and supply the acquired data to processor 106. In some embodiments, sensing circuit 103 may be configured to send raw data (e.g., an array of capacitance values corresponding to each sense point 102) to processor 106. In other embodiments, sensing circuit 103 may be configured to process the raw data itself and deliver processed touch data to processor 106. In either case, the processor may then use the data it receives to control operation of computer system 107 and/or one or more applications running thereon. Various implementations along these lines are described in the applications referenced above, and include a variety of computer systems having touch pads and touch screens.

In some embodiments, sensing circuit 103 may include one or more microcontrollers, each of which may monitor one or more sensing points 102. The microcontrollers may be application specific integrated circuits (ASICs), that work with firmware to monitor the signals from touch sensitive surface 101, process the monitored signals, and report this information to processor 106. The microcontrollers may also be digital signal processors (DSPs). In some embodiments, sensing circuit 103 may include one or more sensor ICs that measure the capacitance in each sensing line 105b and report measured values to processor 106 or to a host controller (not shown) in computer system 107. Any number of sensor ICs may be used. For example, a sensor IC may be used for all lines, or multiple sensor ICs may be used for a single line or group of lines.

FIG. 4 illustrates at a high level process 400 for operating a multi-touch sensing arrangement, like that described above. The process may begin at block 401 where plurality of sensing points 102 are driven. Following block 401, the process flow can proceed to block 402, where the outputs from sensing points 102 are read. For example, a capacitance value for each sensing point 102 can be obtained. Following block 402, the process can proceed to block 403 where an image or other form of data (signal or signals) of the touch at one moment in time can be produced and thereafter analyzed to determine where objects touching or in proximity to the touch sensor may be located. In some embodiments, this image, known as a touch image or proximity image, can comprise a two-dimensional array of the sensor values at each sense node. Following block 403, the process can proceed to block 404, where the current image or signal may be compared to one or more past images or signals to determine a change in one or more of the shape, size, location, direction, speed, acceleration, pressure, etc. for each object. This information can be subsequently used (in step 405) to perform an action in computer system 107, ranging from moving a pointer or cursor to complex gesture-based interactions.

As noted above, for noise rejection purposes, the touch-sensing panel can be driven at multiple different frequencies. Noise that exists at a particular drive frequency may not exist at the other frequencies. In some embodiments, each sensor panel drive line can be stimulated with three different frequencies of square wave pulses, e.g., 140 kHz, 200 kHz, and 260 kHz. Three corresponding sense signals can result in each sense line. These sense signals can each be analyzed to produce a touch value (e.g., a measured capacitance) for each sense node measured at each stimulus frequency. These measured touch values for the entire touch-sensing panel can be combined to form three touch or proximity images, each of which can be considered as a "snapshot" of the touch at a given time. It should be noted that although three different frequencies are used in the examples described herein, other numbers of frequencies could also be used. In any case, the sample values can be processed by either the sense circuit, including the microcontrollers therein, or by the processor of the host system according to the techniques described below.

Proximity images can also undergo a baselining algorithm to remove variations in sensor gain and offset before undergoing statistical noise rejection techniques and combining of clean signals. After baselining, the statistical noise rejection will detect sensor noise from both internal and external noise sources as well as detecting large departures from normal gain and offset values. Exemplary baselining algorithms are described in U.S. patent application Ser. No. 11/619,464, titled "Multi-Touch Input Discrimination," filed Jan. 3, 2007, which is incorporated by reference herein.

I. Two-Clean-Frequency Noise Detection

After baselining, in the absence of substantial noise, the multiple sensor values obtained at the multiple stimulus frequencies can be well correlated, i.e., the touch values obtained at each sense node 102 at each frequency can be about the same. This can be expected, as the measurement taken at each frequency is measuring the same parameter, e.g., capacitance at a particular sense node. However, if noise is present at one frequency, the correlation can break down as between values obtained at the noisy frequency and all others, i.e., the channel with the noise can have a measured value that differs from measured values obtained on the non-noisy channels.

Figure 5:
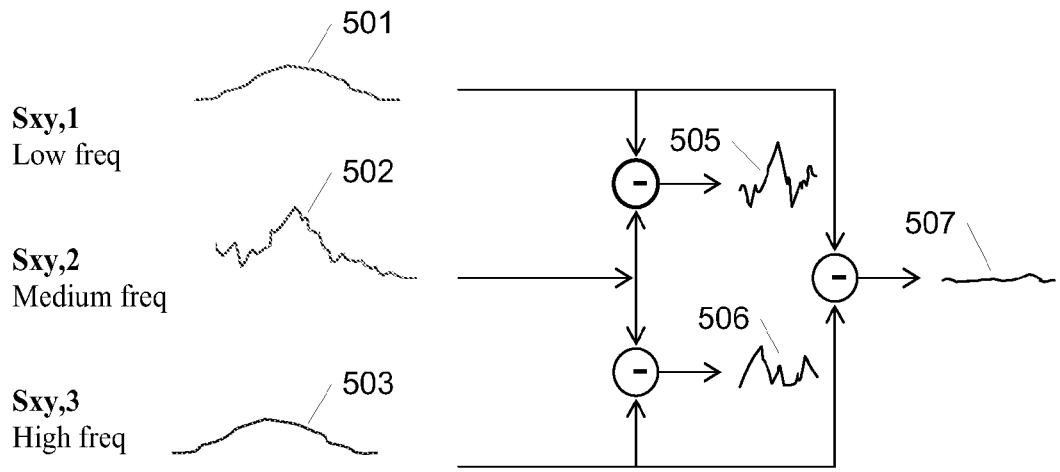
FIG. 5 illustrates a pair-wise comparison of summed noise variances of sample values obtained at three frequencies, with noise on one frequency, in accordance with an embodiment of the present invention.

For example, as illustrated in FIG. 5, three stimulus frequencies can be used to obtain a plurality of sensor values, e.g., a series of low frequency values 501, a series of medium frequency values 502, and a series of high frequency values 503. Noise at or near the medium frequency, for example, can cause values 502 measured at this frequency to take on erroneous values. As a result, the difference 507 between the values obtained at low frequency 501 and the values obtained at high frequency 503 can be relatively small. However, because of noise-induced errors obtained at the medium frequency, the difference 505 between medium frequency values 502 and low frequency values 501 can be relatively large. Similarly, the difference 506 between medium frequency values 502 and high frequency values 503 can also be relatively large. These principles can be used to detect noise free pairs of frequencies, provided at least two clean frequencies to provide a noise-free reference, and at least three stimulus frequencies. In some embodiments, this can be done by determining a mismatch of sample values obtained at each pair of frequencies. The mismatch can be determined as a sum of variances of sample values obtained at each pair of frequencies, as described in greater detail below.

In some embodiments, the differences between sample values obtained at the different frequencies may be used to determine whether noise is present on any frequency pair. For example, the difference between sample values obtained at each pair of frequencies can be compared to a predetermined threshold. Also, the predetermined threshold may be adaptive, i.e., may change in response to changing conditions. If this predetermined threshold is exceeded for a given pair of frequencies, noise can be assumed to be present on one of the two frequencies. By examining all possible pairs of the multiple frequencies used, the frequencies with noise can be isolated.

In other embodiments, statistical analysis of the obtained sample values can be performed, thereby eliminating the need to set a threshold or have a threshold adapt to changing environments and/or conditions. The statistical analysis can be based on the fact that sensor values obtained at each of the sampling frequencies can be considered as comprising the real value and a noise component. For example, sensor values for three frequencies can be expressed as:

$$s_{xy,1} = \mu_{s_{xy,1}} + n_{xy,1}$$

$$s_{xy,2} = \mu_{s_{xy,2}} + n_{xy,2}$$

$$s_{xy,3} = \mu_{s_{xy,3}} + n_{xy,3}$$

where $s_{xy,1}$ can be the sample value for row y, column x obtained at the first frequency, $s_{xy,2}$ can be the sample value for row y, column x obtained at the second frequency, $s_{xy,3}$ can be the sample value for row y, column x obtained at the third frequency, $\mu_{s_{xy,1}}$ can be the mean of the sample values obtained at the first frequency, $\mu_{s_{xy,2}}$ can be the mean of the sample values obtained at the second frequency, $\mu_{s_{xy,3}}$ can be the mean of the sample values obtained at the third frequency, $n_{xy,1}$ can be the noise component at row y, column x obtained at the first frequency, $n_{xy,2}$ can be the noise component at row y, column x obtained at the second frequency, and $n_{xy,3}$ can be the noise component at row y, column x obtained at the third frequency.

After the baselining algorithm, the mean of the real values should be the same for all three frequencies. Similarly, the noise components on each frequency should generally be independent and also normally distributed with a given variance $\sigma^2$. Therefore, variability at a given panel location (x,y) can be detected by measuring the difference between samples obtained at frequencies k and l, given by:

$$S_{kl} = \Sigma(s_{xy,k} - s_{xy,l})^2$$

where $s_{xy,k}$ can be the sample value at row y, column x obtained at a frequency k and $s_{xy,l}$ can be the sample value at row y, column x obtained at a frequency l. By substitution, the variability can reduce to:

$$S_{kl} = \Sigma(n_{xy,k} - n_{xy,l})^2 = \Sigma n'^2_{xy,kl}$$

where $n'_{xy,kl}$ can be the difference in noise components at the panel location x,y obtained at frequency k and frequency l. Based on the assumption that noise components on each frequency are independent and normally distributed, it can be further shown that $n'_{xy,kl}$ will be normally distributed with a mean of zero and a variance $2\sigma^2$.

By assuming that the noise on the rows and columns is statistically independent, the variability can be considered as a sum of squares of independent normally distributed noise amplified by $n2\sigma^2$ where n can be the product of the number of rows and columns in the neighborhood of panel location x,y. Thus, if there is relatively low noise on any two frequencies k and l, variability $S_{kl}$ can be relatively small. However, if there is noise on one of the frequencies, the variability $S_{kl}$ can be substantially higher. For example, if three frequencies are used, with one frequency having significant noise, there will be one clean pair of frequencies showing minimal variance. Either of the other two pairs of frequencies will have higher variance. Therefore, a variety of statistical analyses of variance can be performed to determine whether noise is present.

An example of such a statistical test is to test the hypothesis that the variabilities of samples obtained at all frequencies are equal, i.e., that all frequencies are relatively noise free. Based on the assumptions that the noise on each channel is independent and normally distributed, this hypothesis may be tested using Fischer's variance ratio F-test. Specifically, the ratio of the variability corresponding to a given frequency pair k and l ($S_{kl}$), to the minimum variability of all frequency pairs ($\min(S_{ij})$) can approximately equal the F distribution with n−1 and n−1 degrees of freedom (where, as above, n can be the product of the number of rows and columns of interest). This can be expressed mathematically as:

$$\frac{S_{kl}}{\min(S_{ij})} \sim F(n-1, n-1), kl \neq ij$$

Figure 6:
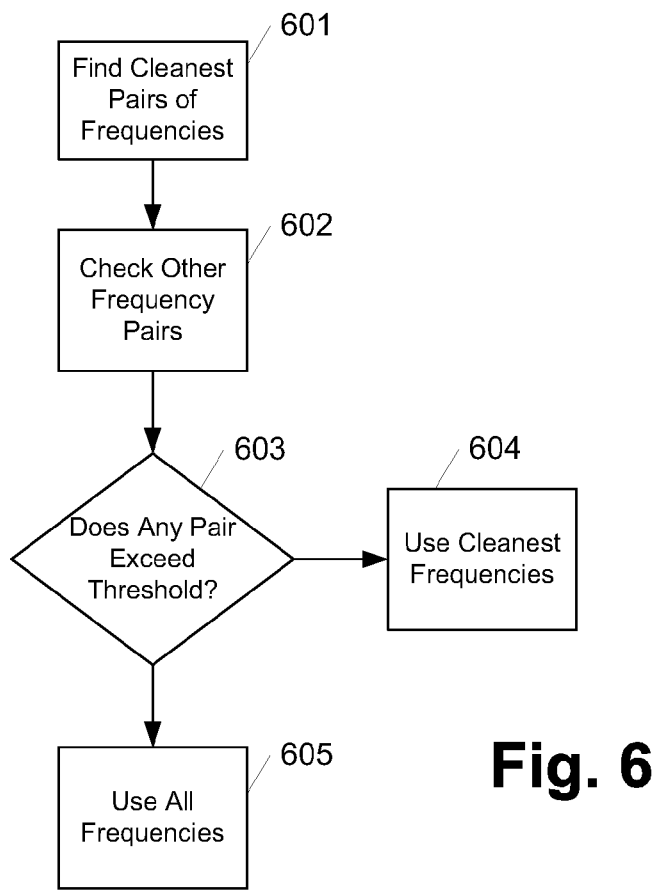
FIG. 6 illustrates a flow chart of a two-clean-frequency noise detection algorithm in accordance with an embodiment of the present invention.

FIG. 6 illustrates an example of an algorithm implementing this statistical test. At block 601, the cleanest pairs of frequencies can be found, which can include finding the pair of frequencies corresponding to the lowest variability. The variabilities described above can be computed for each frequency pair i,j and the minimum of these variabilities can be determined. This can be expressed mathematically as:

$$S_{min} = \min(S_{ij})$$

At block 602, the variability for each group of sample differences, computed as described above, can be checked and compared to the variability for the cleanest sample pair. This can take the form of comparing the variability of each sample pair, computed as described above, to a threshold t (determined from the F-distribution) times the variability of the cleanest frequency pair. This can be expressed mathematically as:

$$S_{ij} > t \cdot S_{min}$$

where $S_{ij}$ and $S_{min}$ can be computed as described above and t can be computed from a table of the F-distribution by selecting a confidence level between 0 and 1. In some embodiments, a value t=4 can be used, which can correspond to a 99.3% confidence level. In other words, if the variability between values obtained for a given frequency pair exceed the variability of values obtained for the cleanest sample pair by a factor of 4 or more, there is a likelihood greater than 99.3% that there is significant noise on the frequency not corresponding to the cleanest sample pair.

The exact value of the threshold t can vary, i.e., threshold values other than 4 may also be used. These other values may be selected based on the particulars of a given system. For example, threshold values of t=5 or t=6 (corresponding to confidence levels of 99.76% and 99.91%) could also be used. A threshold t=3 (corresponding to a confidence level of 97.57%) could be used, but for some applications, this might give too many false positives, i.e., indications of noise in relatively low noise situations.

At block 603, it can be determined whether the variances of any of the frequency pairs exceed the threshold. If so, at block 604, after examining the frequencies composing the cleanest frequency pairs, the mean of the samples obtained at the cleanest frequencies can be used, thereby minimizing the effects of noise on the noisiest sampling frequency. If not, at block 605, the mean of the samples obtained at all three frequencies can be used. Statistical measures other than the mean (e.g., weighted mean, median, mode, majority vote, etc.) could also be used, although some (e.g., majority vote) may require that more than three frequencies be used.

Statistical tests other than the F-test can also be used. For example, Levine's test for equality of variances may be used. Levine's test may be less sensitive to the assumption that the noise on each channel is normally distributed. Although, the F-test may be more conservative (i.e., reject noise more often).

The two-clean-frequency noise algorithm described above assumes that at least one pair of clean frequencies is available. In the case where there at least two relatively noise free frequencies are not available (e.g., two out of a total of three frequencies are noisy), it can become more difficult to distinguish the variances between noisy-noisy frequency pairs versus noisy-quiet frequency pairs. For example, a noisy-noisy pair may have a variance that is twice as great as that of a noisy-quiet pair, which corresponds to an F-test confidence level of only 89.65%. In situations with more noisy channels, the algorithm described below can provide enhanced performance.

II. One-Clean-Frequency Noise Detection

The one-clean-frequency noise algorithm described below can detect if one (or more) frequencies contain relatively high levels of noise, provided at least one noise-free frequency and two or more stimulus frequencies. As an example, in the case of three frequencies with two being noisy, the algorithm can use only the sample values obtained at the least noisy frequency. The algorithm can also detect noise on any one frequency, which can allow it to be combined with the two-clean-frequency noise algorithm as described in greater detail below.

Figure 8:
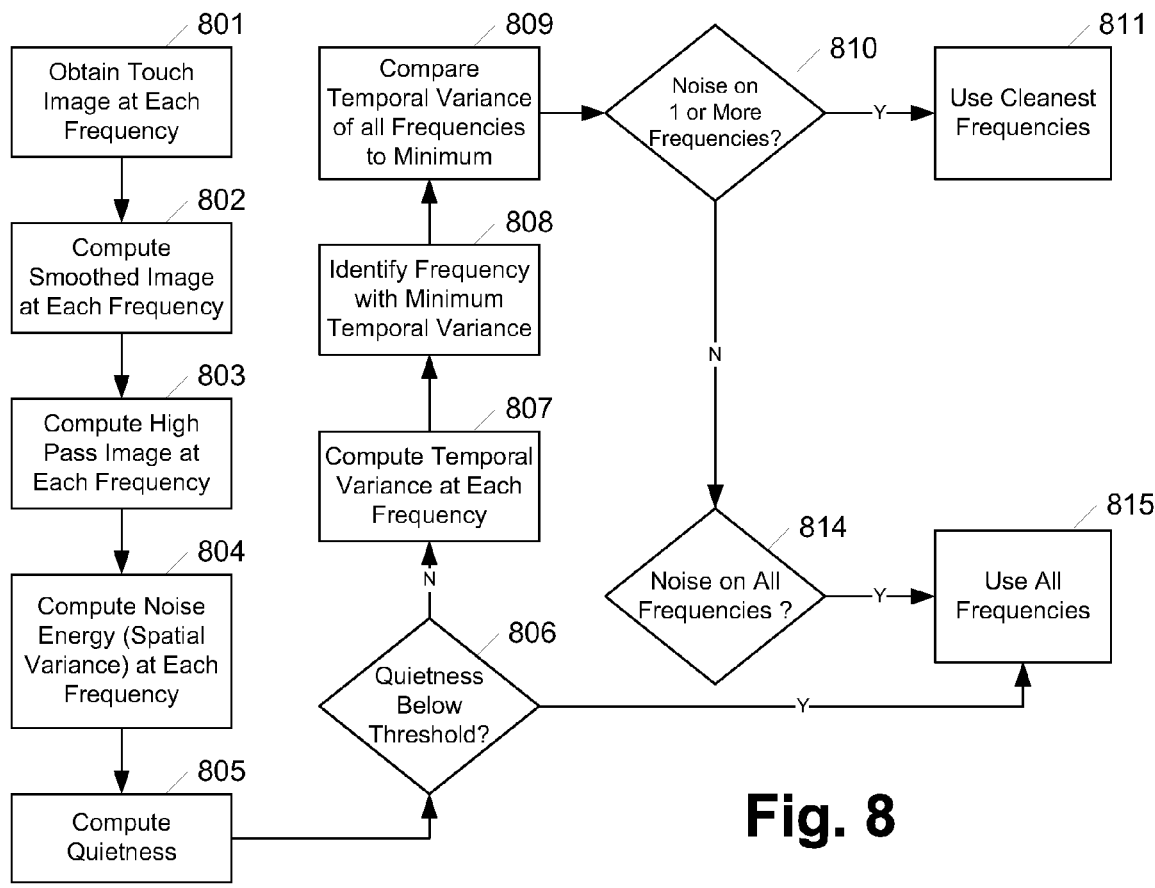
FIG. 8 illustrates a flow chart of a one-clean-frequency noise detection algorithm in accordance with an embodiment of the present invention.

An exemplary one-clean-frequency noise algorithm is illustrated in FIG. 8. As an initial step 801, a touch image can be obtained at each of the drive frequencies. The one-clean-frequency noise algorithm can analyze both spatial and temporal statistics of the sample values. Therefore, subtracting the effects of varying touch (e.g., fingers or other hand parts touching or hovering over the touch sensor) can be part of a one-clean-frequency noise lgorithm, which can avoid confusing the touch signal with the noise signal. This can be accomplished by computing a smoothed touch image for each frequency (block 802) and subtracting each smoothed image from a corresponding touch image (block 803). The smoothed touch image may be computed, for example, by performing an iterated unsharp mask filter on each image frame. Unsharp mask filtering is described in greater detail in U.S. patent application Ser. No. 11/619,464, titled "Multi-Touch Input Discrimination," filed Jan. 3, 2007, which is hereby incorporated by reference.

Unsharp mask filtering may be briefly summarized as follows. The separable 2×2 filter described by:

$$SmoothedImage = \frac{1}{4}\begin{pmatrix}1\\2\\1\end{pmatrix} \otimes \frac{1}{4}(1\ 2\ 1) \otimes Image$$

can be performed on the rows, then the columns of each touch image, i.e., the array of touch or proximity values obtained at each frequency at each time. The smoothed image can then be the touch plateau with ragged edges and noise pulses removed. The noise variance in the unsharp mask image can be $(3/8)^2 \sigma^2$, or roughly 14% of the noise variance $\sigma^2$ on a single sensor, which can give a close approximation to the noise free touch plateau without excessive smoothing, which would distort the shape of the plateau.

The high frequency noise in a touch image can be extracted by the high pass filtering (block 803). As noted above, the high pass filtering can take the form of subtracting the smoothed image (e.g., as computed above) from the original (unsmoothed) image. This can be mathematically expressed as:

HighPassImage=Image−SmoothedImage

The noise in the high pass image can be determined (block 804) by a sum of squares (or alternatively a sum of absolute values) of the individual values making up the smoothed image. The sum can take place over a range of pixels x,y, which can be either all of the pixels of an image or a subset of the pixels in the image. Thus the noise signal can be mathematically expressed as:

$$SpatialVar = \sum_{(x,y)} HighPassImage_{x,y}^2$$

where SpatialVar is the spatial variance of the high pass image and HighPassImage$_{x,y}$ is the value of the high pass image at a coordinate x,y.

One potential side effect of using the spatial variance of the high pass image as a measure of noise can be a relatively high spatial variance when there is no touch or when there is a stationary touch in the absence of substantial noise. Thus, detecting these quiet conditions can be used to avoid false indications of substantial noise in relatively low noise conditions. Under quiet conditions, the sensor values obtained at each frequency can cluster very tightly. Thus, a measure of quietness Q can be expressed as:

$$Q = \max_{t,t-1...t-n+1} (MAD(SpatialVar_{f_1}[t], \ldots, SpatialVar_{f_N}[t]))$$

where MAD is the median absolute deviation function, SpatialVar$_{f_1}$[t] is the spatial variance of a touch image taken at time t at a frequency $f_1$, SpatialVar$_{f_2}$[t] is the spatial variance of a touch image taken at time t at a frequency $f_2$, SpatialVar$_{f_3}$[t] is the spatial variance of a touch image taken at time t at a frequency $f_3$, etc., and N is the number of stimulus frequencies, n is the number of frames over which we take the maximum. In some embodiments N can be three.

A low noise condition can be assumed if the quietness value Q (computed at block 805) is less than a predetermined quietness threshold $Q_T$, i.e., $Q<Q_T$. If the quietness is less than the threshold (determined at block 806), then it can be assumed that there is low noise on all frequencies, and thus all frequencies can be used in the touch image (block 815). In some embodiments, under quiet conditions, Q can be below about 0.02, so a conservative threshold can be 0.1. Other values may also be used depending on the exact application, parameters, etc. The parameter n may be large enough to encompass the time interval over which the noise is expected to exhibit significant fluctuations. In some embodiments, n can be 3 frames. Due to the fluctuating nature of most noise, the noise signal may be momentarily absent for one or more frames, so the maximum function can be used to improve reliability of detection.

Figure 7:
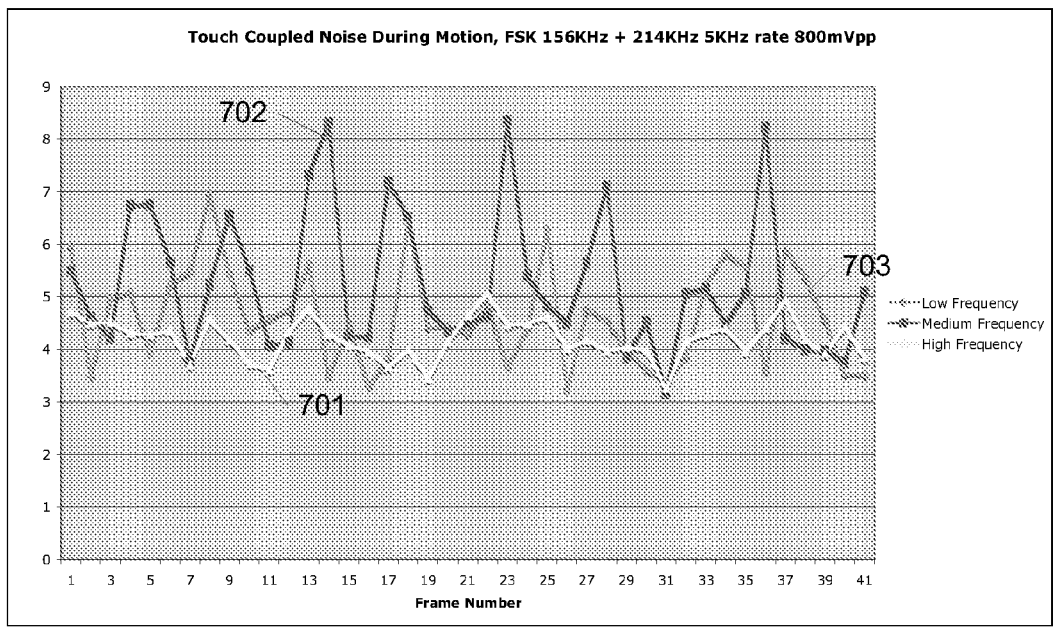
FIG. 7 illustrates a plot of spatial variance of sample values over time in accordance with an embodiment of the present invention.

If the quietness is determined to be above a threshold (at block 806), it can be assumed that noise is present on one or more frequencies. Thus, the algorithm can proceed to block 807, where a temporal variance (as opposed to a spatial variance) can be computed. As illustrated in FIG. 7, the spatial variance as a function of time for clean frequencies 701 can show considerable variability as compared to the spatial variance as a function of time for noisy frequencies 702 and 703. Because of this, the total length of the curve of spatial variance as a function of time can be used as an indicator of noise level. The total digital arc length of each of the curves, which can be directly related to the sum of the squares of the adjacent pixel derivative, by use of the Pythagorean theorem on each segment of the curve, can be computed as:

$$TD_f = \sum_{t,t-1...t-m+1} (SpatialVar_f[t+1] - SpatialVar_f[2])^2$$

where SpatialVar$_f$[t] is the spatial variance of a frame at a time t taken at a frequency f, SpatialVar$_f$[t+1] is the spatial variance of the next frame, also at a frequency f, and m is the number of frames over which to compute the temporal variance. The parameter m may be large enough to encompass the time interval over which the noise exhibits significant fluctuations. In some embodiments, m can be 10 frames.

The spatial variance can be assumed to be the sensor's real signal at time t ($\mu_f$[t]), superimposed with time-independent, zero mean, normally distributed noise $n_f$[t] having variance $\sigma^2$, which can be expressed mathematically as:

SpatialVar$_f$[t]=$\mu_f$[t]+$n_f$[t]

Therefore, the derivative of the noise directly measures the noise energy, $$TD_f = \sum_{t, t-1 \ldots t-m+1} n'_f[t]^2$$

where $n'_f$ is normally distributed with zero mean and variance $2\pi^2$.

Therefore, as in the first algorithm, noise detection can be based on a statistical analysis of the temporal variance $TD_f$. For example, the hypothesis that the variances are equal (all clean frequencies) can be tested (at block 809) using Fischer's variance ratio F-test in pairs, as in the two-clean-frequency algorithm described above. The hypothesis will be rejected, i.e., noise will be detected, if the deviation is sufficiently improbable. In particular, the algorithm can test the ratio of the temporal variance for each frequency (computed at block 807) to the minimum temporal derivative (computed at block 808). Thus the detection of a noisy frequency can be expressed as:

$$\frac{TD_f}{\min(TD_f)} > TDThreshold$$

where TDThreshold can be any appropriate value, for example, 3.0, corresponding to a 95% level of significance for the Fischer F-distribution with m−1 and m−1 degrees of freedom. Under quiet conditions, variance ratios of the various frequencies should cluster together and be close to 1, e.g., between 1.0 and 1.3.

The comparisons of each frequency's variance to the minimal variance will allow a decision to be made for each frequency whether noise exists on that frequency. If noise exists on any frequency (block 810), then the cleanest frequencies can be used in computing the sample values, thus rejecting the noise on the noisy frequencies. If noise exists on all frequencies, then all frequencies can be used, as there may be no effective way of eliminating the noise present on all channels. As above, various combinations of the sample values obtained at each frequency (including, for example, mean, weighted mean, median, mode, etc.) can be used.

III. Combined Two-Clean-Frequency/One-Clean-Frequency Noise Detection

The two-clean-frequency noise rejection algorithm and one-clean-frequency noise rejection algorithm described above can also be combined into a single algorithm, an example of which can be seen in FIGS. 9A-9E.

FIG. 9A illustrates an overview of the combined algorithm. At a first block 901, background noise above a predetermined threshold can be detected. As noted above, this can help avoid false positives due to background level fluctuations. Details of the higher than background noise detection block may be seen in FIG. 9B, which is discussed in greater detail below.

If no noisy frequencies are detected, the two-clean-frequency noise detection block 907 can be employed. This algorithm can have high sensitivity to noise interference, and can therefore be used to redundantly determine whether any frequencies have noise contamination. Two-clean-frequency noise detection block 907 is described in greater detail below with respect to FIG. 9C. If two-clean-frequency noise detection block 907 confirms that no frequencies are noisy, the mean (or other statistical measure) of sample values for all frequencies can be used (block 917). Alternatively, if two-clean-frequency noise detection block 907 determines that noise is present on frequency, the mean (or other statistical measure) of sample values for the cleanest frequencies can be used (block 918).

If one or more noisy frequencies are detected by background noise detection block 901, one-clean-frequency noise detection block 909 can be employed. One-clean-frequency noise detection block 909 is described in greater detail below with respect to FIG. 9D. If one-clean-frequency noise detection block 909 detects noise on zero or one frequency, two-clean-frequency noise detection block 907 is employed. As above, if two-clean-frequency noise detection block 907 confirms that no frequencies are noisy (unlikely if one-clean-frequency noise detection block 909 has already detected noise), the mean (or other statistical measure) of sample values for all frequencies can be used (block 917). Alternatively, if two-clean-frequency noise detection block 907 determines that noise is present on one frequency (more likely if one-clean-frequency noise detection block 909 has already detected noise), the mean (or other statistical measure) of sample values for the cleanest two frequencies can be used (block 918). If one-clean-frequency noise detection block 909 detects noise on two frequencies, the sample values for the cleanest two frequencies can be used (block 926). If one-clean-frequency noise detection block 909 detects noise on three frequencies, the sample values for all three frequencies can be used (block 927), as eliminating one or more of the noisy frequencies may still not overcome the noise if all frequencies are noisy.

As noted above, higher than background noise detection block 901 is further illustrated in FIG. 9B. The purpose of higher than background noise detection block is to detect if the noise level on any frequencies is above the background noise level. At a normal background noise level, spatial noise variances for all three frequency channels will cluster together closely. This can be verified by computing a spatial variance at a given time for the samples obtained at each frequency (e.g., three frequencies, $f_1$, $f_2$, and $f_3$) (blocks 902a, 902b, and 902c). The median absolute deviation of the spatial variances can then be computed (block 903). Due to the impulsive nature of the noise in time, it may be desirable to detect over a period of time (e.g., three touch images) to confirm noise is present when the maximum median absolute deviation exceeds a threshold. The maximum median absolute deviation over this period of time can be determined (block 904) and compared to a threshold (block 905). If the background noise exceeds the threshold then noise is detected, and the process proceeds as described above with reference to FIG. 9A. Details of the computation of spatial variances, threshold values, etc. can be as described above in the discussion of the one-clean-frequency noise detection algorithm.

Figure 9C:
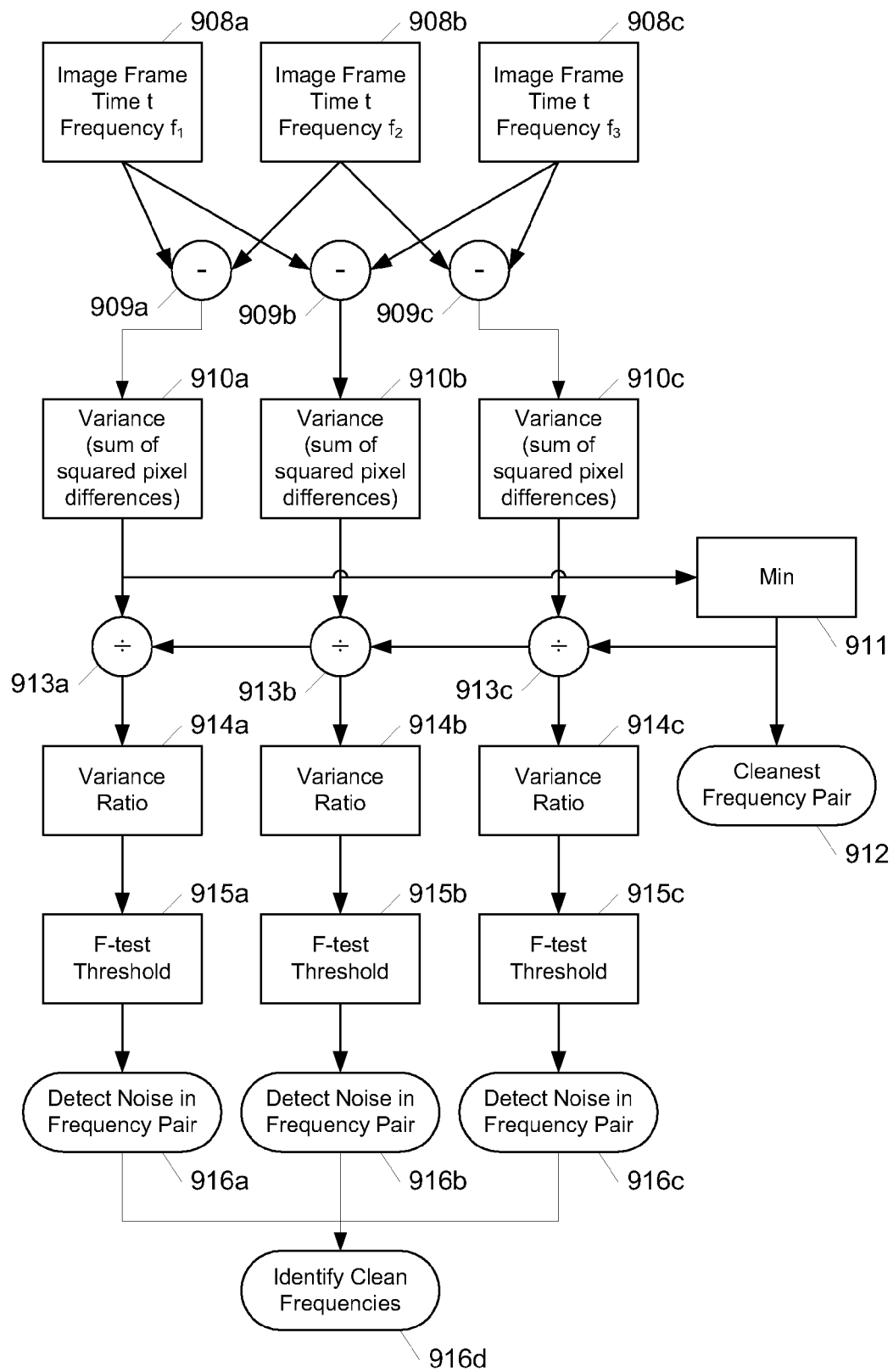
FIG. 9C illustrates a flow chart of a two-clean-frequency noise detection portion of a combined two-clean-frequency/ one-clean-frequency noise detection algorithm in accordance with an embodiment of the present invention.

Two-clean-frequency noise detection block 907 is further illustrated in FIG. 9C for the example of three stimulus frequencies. It should be noted that because the two-clean-frequency noise detection block operates on samples obtained at a single time t, the process can be unaffected by the effects of varying touch. When all frequencies are clean or when only a single frequency is noisy, there can be at least one clean pair of frequencies that can be used at a given time. Correlating pairs of channels and comparing to a threshold can find the cleanest pair of frequencies. For example, three touch image frames 908a, 908b, and 908c obtained at a given time t can be subtracted from one another (blocks 909a, 909b, and 909c) and the variances of each difference frame can be computed (blocks 910a, 910b, and 910c). The variances can be computed as a sum of squares of the pixel differences, as described above in the description of the two-clean-frequency noise algorithm.

Statistical testing of variance ratios can be used to detect interference. For example, the minimum of the variances computed in blocks 910a, 910b, and 910c can be determined (block 911), which indicates the cleanest pair of frequencies (block 912). The variance ratios 914a, 914b, and 914c can be computed (in blocks 913a, 913b, and 913c) by dividing each (computed in blocks 910a, 910b, and 910c) to the minimum variance (computed in block 911). The variance ratios 914a, 914b, and 914c can then be compared to a threshold, for example, a statistical F-test (as described in detail above). If the variance ratio of any frequency pair exceeds the threshold, a noise detection event is triggered (blocks 916a, 916b, and 916c). By examining all clean pairs of frequencies (those with no noise triggering), one can identify the clean frequencies (block 916d), and use them as described above. For example, if there are three stimulus frequencies, one may use the cleanest two frequencies determined by block 912.

Figure 9E:
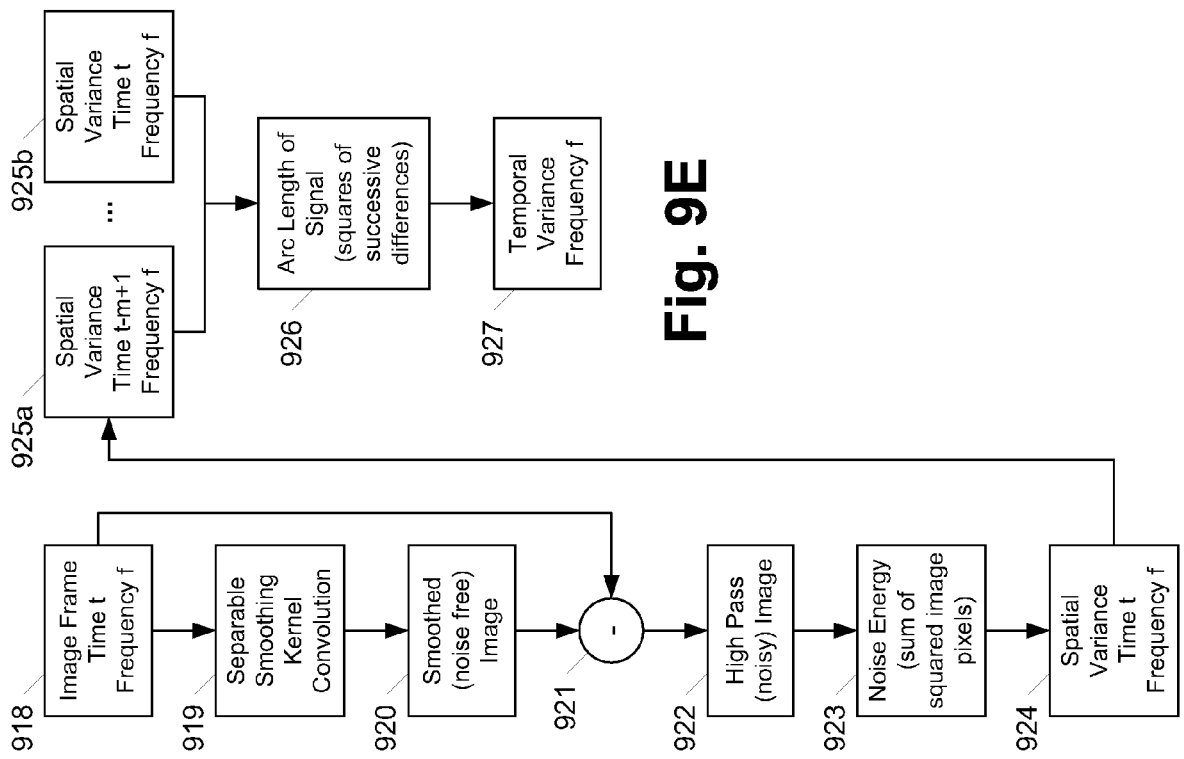
FIG. 9E illustrates a flow chart of a temporal variance computation portion of a combined two-clean-frequency/ one-clean-frequency noise detection algorithm in accordance with an embodiment of the present invention.
Figure 9D:
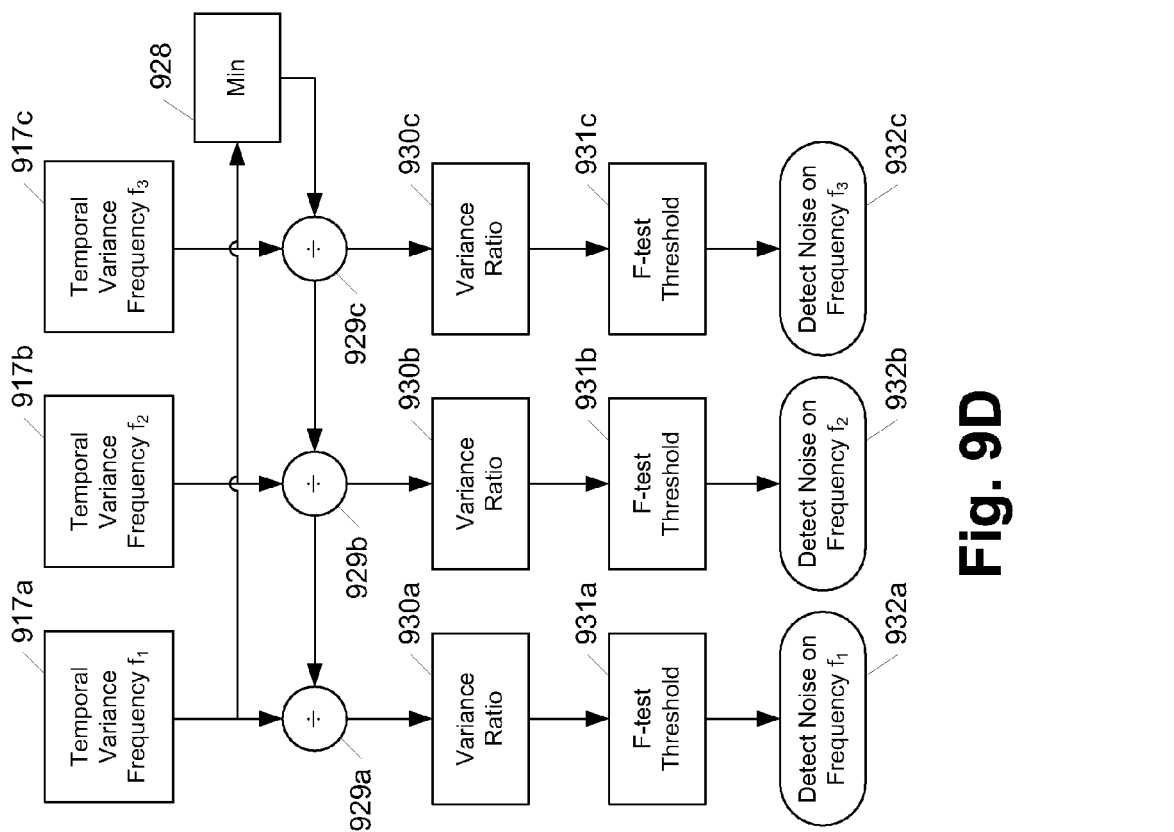
FIG. 9D illustrates a flow chart of a one-clean-frequency noise detection portion of a combined two-clean-frequency/ one-clean-frequency noise detection algorithm in accordance with an embodiment of the present invention.

One-clean-frequency noise detection block 909 is further illustrated in FIG. 9D for the example of three stimulus frequencies. As a first step, temporal variances 917a, 917b, and 917c can be computed for the touch images obtained at a series of frequencies (e.g., $f_1$, $f_2$, $f_3$). These temporal variances can be computed, for example, according to the process described above and described in further detail below with respect to FIG. 9E. The minimum of these temporal variances 917a, 917b, and 917c can be obtained (block 928), and the ratio of each variance to the minimum variance can be computed (blocks 929a, 929b, and 929c). This can yield variance ratios 930a, 930b, and 930c.

Statistical testing can then be performed on these temporal variance levels (blocks 931a, 931b, and 931c). For example, the ratios can be subjected to an F-test as described above. This can be indicative of a high probability of noise at a given frequency. This can be because under quiet conditions, all signals can cluster together, but the variance ratios can diverge significantly when noise is present. If the variance ratio for a given frequency so diverges, noise can be detected on a given frequency (blocks 932a, 932b, and 932c). As noted above with respect to FIG. 9A, noise on zero or one frequency can invoke two-clean-frequency noise detection block 907. Noise on two or more, but not all frequencies can cause the cleanest frequencies to be used (block 926). Noise on all frequencies can cause the mean of all frequencies to be used (block 927).

Computation of the temporal variances 917a, 917b, and 917c can be further understood with reference to FIG. 9E. As discussed above, the variations of a user's touching the panel can be filtered out to focus on the noise (if any). This can be done by taking a touch image frame obtained at a time t and frequency f (block 918) and subjecting it to a smoothing filter (block 919). The smoothing filter can take the form of the unsharp mask described above. The resulting smoothed image (block 920) can then be subtracted (block 921) from the original image frame to create a high pass (noisy) image 922.

High pass filtering the image and measuring its variance can give a measure of the noise energy at time t. Therefore, the noise energy in the high pass image can be computed, e.g., as a sum of squares of pixels in the image (block 923). This gives the spatial variance of the frame at time t and frequency f (block 924). However, this energy signal can itself be highly variable, and a given frame may show a low spatial noise level, even though noise is present at one or more frequencies. Therefore, its variation in time can be measured to increase the reliability of noise detection.

To compute the variation in time of the spatial variance (i.e., the temporal variance), a plurality of spatial variances 925a-925n may be plotted as a function of time. The total length of the signal (or a number directly related thereto, such as a sum of squares of differences) connecting these plotted values can be computed (block 928). This arc length can then be the temporal variance for a given frequency (block 929). Further details of this computation are also discussed above.

IV. Applications

Figure 10:
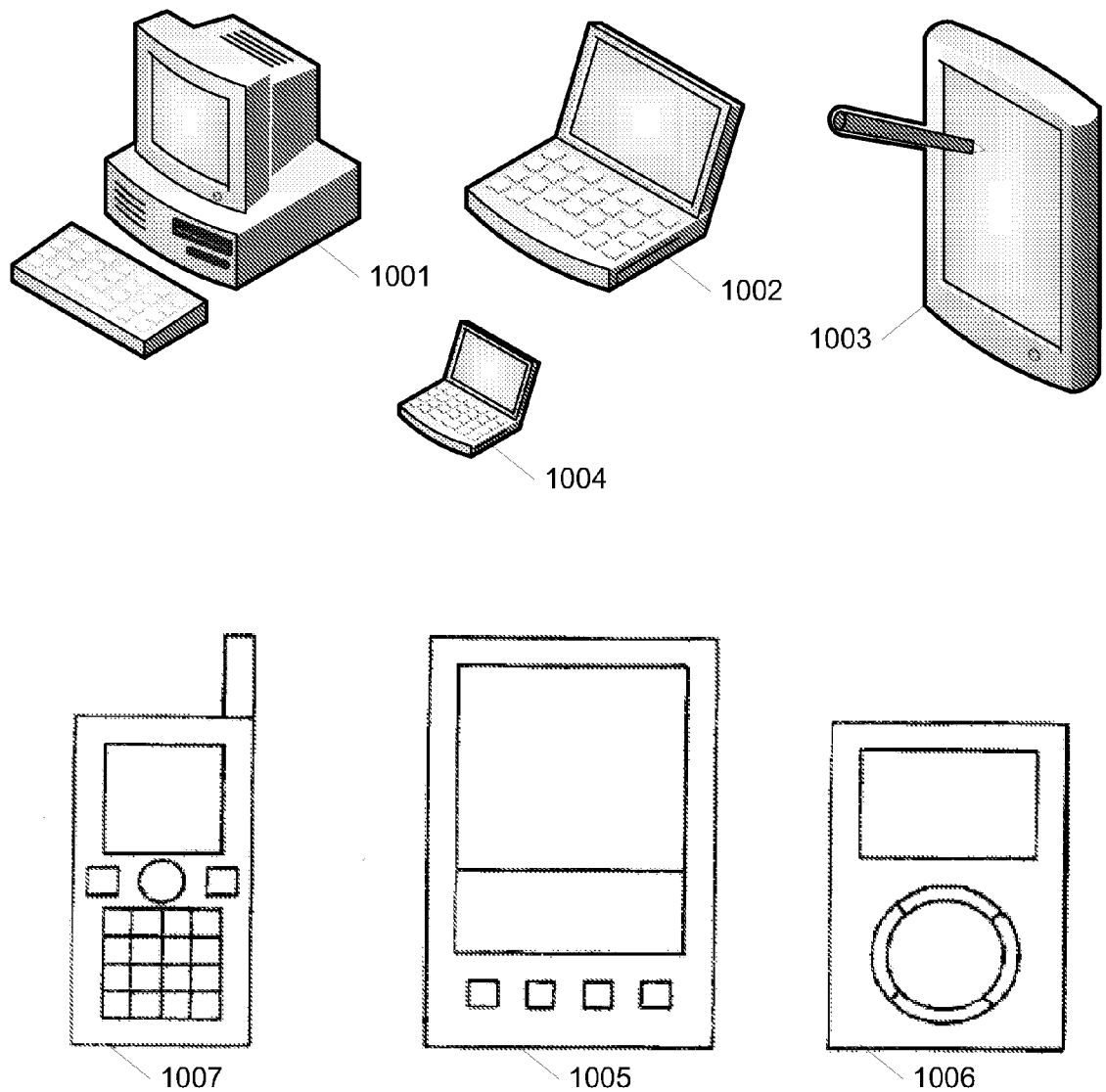
FIG. 10 illustrates a variety of electronic device and computer system form factors that may be used in accordance with an embodiment of the present invention.

The principles described herein may be used to devise input devices for a variety of electronic devices and computer systems. These electronic devices and computer system may be any of a variety of types illustrated in FIG. 10, including desktop computers 1001, notebook computers 1002, tablet computers 1003, handheld computers 1004, personal digital assistants 1005, media players 1006, mobile telephones 1007, and the like. Additionally, the electronic devices and computer systems may be combinations of these types, for example, a device that is a combination of a personal digital assistant, media player, and mobile telephone.

Other alternations, permutations, and combinations of the aforementioned embodiments are also possible. For example, although the embodiments described herein use three sampling frequencies, other numbers of frequencies can also be used. As another example, though predetermined sampling frequencies have been discussed, the noise detection algorithms discussed herein may also be used to trigger the selection from among a plurality of possible frequencies if it is determined, for example, that a particular frequency is subject to noise over a substantial period of time.

Moreover, the principles herein, though described with reference to capacitive multi-touch systems, are equally applicable to any systems in which touch or proximity sensing depends on information extracted from periodic stimulus waveforms. Furthermore, although described in the context of touch-sensing systems, the frequency hopping techniques described herein may also apply in other applications, such as other types of sensing, communications, etc. It is therefore intended that the following claims be interpreted as including all alterations, permutations, combinations and equivalents of the foregoing.

What is claimed is:

1. A method of detecting noise in one of at least three touch images, each touch image comprising a plurality of touch sample values obtained by stimulating a touch sensor at a unique frequency, the method comprising:
    determining a mismatch of sample values obtained at each pair of frequencies;
    comparing the mismatches to identify one or more noisy frequencies; and
    if one or more noisy frequencies are identified, computing a touch value as a function of sample values obtained at frequencies other than the identified noisy frequencies.

2. The method of claim 1 wherein a mismatch is determined as a sum of variances of sample values obtained at each pair of frequencies.

3. The method of claim 1 wherein the plurality of touch sample values are baselined to remove variations in touch sensor gain and offset prior to determining the sum of variances of sample values obtained at each frequency.

4. The method of claim 1 wherein comparing the mismatches to identify a noisy frequency comprises comparing the determined mismatches to a predetermined threshold.

5. The method of claim 4 wherein the predetermined threshold is an adaptive threshold.

6. The method of claim 2 wherein:
determining the sum of variances of sample values obtained at each pair of frequencies further comprises:
subtracting sample values obtained at a first frequency from sample values obtained at a second frequency to obtain the sum of variances of a first frequency pair;
subtracting sample values obtained at a second frequency from sample values obtained at a third frequency to obtain a sum of variances of a second frequency pair; and
subtracting sample values obtained at a third frequency from sample values obtained at a first frequency to obtain a sum of variances of a third frequency pair; and
comparing the determined variances to identify a noisy frequency further comprises:
computing a first variance corresponding to the sum of variances of the first frequency pair;
computing a second variance corresponding to the sum of variances of the second frequency pair;
computing a third variance corresponding to the sum of variances of the third frequency pair; and
performing an analysis of variance on the computed variances.

7. The method of claim 6 wherein performing an analysis of variance on the computed variances further comprises:
identifying a minimum variance of the computed variances;
computing variance ratios of the computed variances to the minimum variance; and
comparing the variance ratios to a threshold determined from a statistical test.

8. The method of claim 7 wherein the statistical test is an F-test.

9. The method of claim 7 wherein the statistical test is Levine's test.

10. A touch sensing device comprising:
a touch sensitive surface having a plurality of touch sensors;
drive circuitry configured to apply drive signals to the touch sensors wherein the drive signals comprise at least three periodic waveforms each having a unique frequency;
sense circuitry configured to derive a touch image for each frequency, each touch image comprising a plurality of touch sample values obtained at each frequency; and
additional circuitry configured to detect noise in one of the touch images by:
determining a mismatch of sample values obtained at each pair of frequencies;
comparing the determined mismatches to identify a noisy frequency; and
if a noisy frequency is identified, computing a touch value as a function of sample values obtained at frequencies other than the identified noisy frequency.

11. The touch sensing device of claim 10 wherein a mismatch is determined as a sum of variances of sample values obtained at each pair of frequencies.

12. The touch sensing device of claim 10 wherein one of the sense circuitry and the additional circuitry is configured to baseline the plurality of touch sample values obtained at each frequency by removing variations in sensor gain and offset.

13. The touch sensing device of claim 10 wherein the additional circuitry is part of the sense circuitry.

14. The touch sensing device of claim 10 wherein the additional circuitry comprises at least one microcontroller.

15. The touch sensing device of claim 10 wherein the touch sample values correspond to a capacitance measurement at each touch sensor.

16. The touch sensing device of claim 10 wherein the touch sensitive surface is part of a touch screen.

17. The touch sensing device of claim 10 wherein the additional circuitry compares the mismatches to identify a noisy frequency by comparing the mismatches to a predetermined threshold.

18. The touch sensing device of claim 17 wherein the predetermined threshold is an adaptive threshold.

19. The touch sensing device of claim 11 wherein:
the additional circuitry determines a sum of variances of sample values obtained at each pair of frequencies by:
subtracting sample values obtained at a first frequency from sample values obtained at a second frequency to obtain a sum of variances of a first frequency pair;
subtracting sample values obtained at a second frequency from sample values obtained at a third frequency to obtain a sum of variances of a second frequency pair; and
subtracting sample values obtained at a third frequency from sample values obtained at a first frequency to obtain a sum of variances of a third frequency pair; and
the additional circuitry compares the determined variances to identify a noisy frequency by:
computing a first variance corresponding to the sum of variances of the first frequency pair;
computing a second variance corresponding to the sum of variances of the second frequency pair;
computing a third variance corresponding to the sum of variances of the third frequency pair; and
performing an analysis of variance on the computed variances.

20. The touch sensing device of claim 19 wherein performing an analysis of variance on the computed variances further comprises:
identifying a minimum variance of the computed variances;
computing variance ratios of the computed variances to the minimum variance; and
comparing the variance ratios to a threshold determined from a statistical test.

21. The method of claim 20 wherein the statistical test is an F-test.

22. An electronic device having as an input device a touch sensing device according to any of claims 10, 16, 17, 19, or 20.

23. The electronic device of claim 22 wherein the electronic device is selected from the group consisting of a desktop computer, a tablet computer, and a notebook computer.

24. The electronic device of claim 22 wherein the electronic device comprises at least one of a handheld computer, a personal digital assistant, a media player, and a mobile telephone.

25. A mobile telephone having as an input device a touch sensing device according to any of claims 10, 16, 17, 19, or 20.

26. A method of detecting noise in one or more of at least two touch images, each touch image comprising a plurality of touch sample values obtained by stimulating a touch sensor at a unique frequency, the method comprising:
computing a smoothed image corresponding to each frequency from each of the at least two touch images;

computing a high pass image corresponding to each frequency from the touch image at each frequency and the smoothed image at each frequency;

computing a spatial variance for each frequency from the high pass image for each frequency, the spatial variance being representative of noise energy in each of the high pass images;

computing a temporal variance representative of noise energy for each frequency as a function of time, wherein the temporal variance is a function of the computed spatial variance for each frequency and one or more prior spatial variances for each frequency; and comparing the computed temporal variances for each frequency to identify a noisy frequency.

27. The method of claim 26 further comprising:

if no noisy frequencies are identified, computing a touch value as a function of sample values obtained at all frequencies;

if one or more noisy frequencies are identified, computing a touch value as a function of sample values obtained at all frequencies other than the one or more noisy frequencies;

if all frequencies are identified as noisy, computing a touch value as a function of sample values obtained at all frequencies.

28. The method of claim 26 wherein the smoothed image corresponding to each frequency is computed by performing an unsharp mask on a corresponding touch image.

29. The method of claim 26 wherein the high pass image corresponding to each frequency is computed by subtracting the smoothed image at each frequency from the touch image at each frequency.

30. The method of claim 26 wherein the temporal variance is directly related to a length of a curve of a plot of a plurality of spatial variances as a function of time.

31. The method of claim 26 wherein comparing the computed temporal variances for each frequency to identify a noisy frequency further comprises performing an analysis of variance on the temporal variances.

32. The method of claim 31 wherein performing an analysis of variance on the temporal variances further comprises:

identifying a minimum temporal variance of the temporal variances for each frequency;

computing variance ratios of the temporal variances for each frequency to the minimum temporal variance; and comparing the variance ratios to a threshold determined from a statistical test.

33. The method of claim 32 wherein the statistical test is an F-test.

34. The method of claim 26 further comprising:

computing a quietness value as a function of the computed spatial variances;

comparing the quietness value to a predetermined threshold; and if the quietness value does not exceed the predetermined threshold, determining that there is low noise on all frequencies.

35. The method of claim 34 wherein the quietness value is computed as a function of the maximum absolute deviation of the spatial variances.

36. A touch sensing device comprising:

a touch sensitive surface having a plurality of touch sensors;

drive circuitry configured to apply drive signals to the touch sensors wherein the drive signals comprise at least three periodic waveforms each having a unique frequency;

sense circuitry configured to derive a touch image for each frequency, each touch image comprising a plurality of touch sample values obtained at each frequency; and additional circuitry configured to detect noise in one of the touch images by:

computing a smoothed image corresponding to each frequency from each of the at least two touch images;

computing a high pass image corresponding to each frequency from the touch image at each frequency and the smoothed image at each frequency;

computing a spatial variance for each frequency from the high pass image for each frequency, the spatial variance being representative of noise energy in each of the high pass images;

computing a temporal variance representative of noise energy for each frequency as a function of time, wherein the temporal variance is a function of the computed spatial variance for each frequency and one or more prior spatial variances for each frequency; and comparing the computed temporal variances for each frequency to identify a noisy frequency.

37. The touch sensing device of claim 36 wherein one of the sense circuitry and the additional circuitry is configured to baseline the plurality of touch sample values obtained at each frequency by removing variations in sensor gain and offset.

38. The touch sensing device of claim 36 wherein the additional circuitry is part of the sense circuitry.

39. The touch sensing device of claim 36 wherein the additional circuitry comprises at least one microcontroller.

40. The touch sensing device of claim 36 wherein the touch sample values correspond to a capacitance measurement at each touch sensor.

41. The touch sensing device of claim 36 wherein the touch sensitive surface is part of a touch screen.

42. The touch sensing device of claim 36 wherein the additional circuitry is further configured to:

if no noisy frequencies are identified, computing a touch value as a function of sample values obtained at all frequencies;

if one or more noisy frequencies are identified, computing a touch value as a function of sample values obtained at all frequencies other than the one or more noisy frequencies;

if all frequencies are identified as noisy, computing a touch value as a function of sample values obtained at all frequencies.

43. The touch sensing device of claim 36 wherein the additional circuitry computes the smoothed image corresponding to each frequency by performing an unsharp mask on a corresponding touch image.

44. The touch sensing device of claim 36 wherein the additional circuitry computes the high pass image corresponding to each frequency by subtracting the smoothed image at each frequency from the touch image at each frequency.

45. The touch sensing device of claim 36 wherein the temporal variance is directly related to a length of a curve of a plot of a plurality of spatial variances as a function of time.

46. The touch sensing device of claim 36 wherein the additional circuitry compares the computed temporal variances for each frequency to identify a noisy frequency by performing an analysis of variance on the temporal variances.

47. The touch sensing device of claim 46 wherein the additional circuitry performs an analysis of variance on the temporal variances by:

identifying a minimum temporal variance of the temporal variances for each frequency;
computing variance ratios of the temporal variances for each frequency to the minimum temporal variance; and
comparing the variance ratios to a threshold determined from a statistical test.

48. The touch sensing device of claim 47 wherein the statistical test is an F-test.

49. The touch sensing device of claim 36 wherein the additional circuitry is further configured to:
compute a quietness value as a function of the computed spatial variances;
compare the quietness value to a predetermined threshold; and
if the quietness value does not exceed the predetermined threshold, determine that there is low noise on all frequencies.

50. The touch sensing device of claim 49 wherein the quietness value is computed as a function of the maximum absolute deviation of the spatial variances.

51. An electronic device having as an input device a touch sensing device according to any of claims 36, 41, 42, 46, 47, or 49.

52. The electronic device of claim 51 wherein the electronic device is selected from the group consisting of a desktop computer, a tablet computer, and a notebook computer.

53. The electronic device of claim 51 wherein the electronic device comprises at least one of a handheld computer, a personal digital assistant, a media player, and a mobile telephone.

54. A mobile telephone having as an input device a touch sensing device according to any of claims 36, 41, 42, 46, 47, or 49.

55. A method of detecting noise in one or more of at least three touch images, each touch image comprising a plurality of touch sample values obtained by stimulating a touch sensor at a unique frequency, the method comprising:
determining whether noise in any of the at least three touch images exceeds a background noise level;
if noise in any of the touch images exceeds a background noise level performing a one-clean-frequency noise detection method; and
if noise in all of the touch images does not exceed a background level or if the one-clean-frequency noise detection method finds noise in any one of the touch images, performing a two-clean-frequency noise detection method.

56. The method of claim 55 wherein the two-clean-frequency noise detection method comprises a method according to any of claims 1, 6, or 7.

57. The method of claim 55 wherein the one-clean-frequency noise detection method comprises a method according to any of claims 26, 27, 31, or 32.

58. The method of claim 55 wherein determining whether noise in any of one or more touch images exceeds a background noise level further comprises:
computing a quietness value as a function of a plurality of computed spatial variances of the one or more touch images;
comparing the quietness value to a predetermined threshold; and
if the quietness value does not exceed the predetermined threshold, determining that there is low noise on all frequencies.

59. A touch sensing device comprising:
a touch sensitive surface having a plurality of touch sensors;
drive circuitry configured to apply drive signals to the touch sensors wherein the drive signals comprise at least three periodic waveforms each having a unique frequency;
sense circuitry configured to derive a touch image for each frequency, each touch image comprising a plurality of touch sample values obtained at each frequency; and
additional circuitry configured to detect noise in one of the touch images by:
determining whether noise in any of the at least three touch images exceeds a background noise level;
if noise in any of the at least three touch images does not exceed a background noise level performing a two-clean-frequency noise detection method; and
if noise in any of the at least three touch images exceeds a background noise level performing a one-clean-frequency noise detection method.

60. The touch sensing device of claim 59 wherein one of the sense circuitry and the additional circuitry is configured to baseline the plurality of touch sample values obtained at each frequency by removing variations in sensor gain and offset.

61. The touch sensing device of claim 59 wherein the additional circuitry is part of the sense circuitry.

62. The touch sensing device of claim 59 wherein the additional circuitry comprises at least one microcontroller.

63. The touch sensing device of claim 59 wherein the touch sample values correspond to a capacitance measurement at each touch sensor.

64. The touch sensing device of claim 59 wherein the touch sensitive surface is part of a touch screen.

65. The touch sensing device of claim 59 wherein the two-clean-frequency noise detection method comprises a method according to any of claims 1, 6, or 7.

66. The touch sensing device of claim 59 wherein the one-clean-frequency noise detection method comprises a method according to any of claims 26, 27, 31, or 32.

67. An electronic device having as an input device a touch sensing device according to claim 59.

68. The electronic device of claim 67 wherein the electronic device is selected from the group consisting of a desktop computer, a tablet computer, and a notebook computer.

69. The electronic device of claim 67 wherein the electronic device comprises at least one of a handheld computer, a personal digital assistant, a media player, and a mobile telephone.

70. A mobile telephone having as an input device a touch sensing device according to claim 59.

* * * * *

UNITED STATES PATENT AND TRADEMARK OFFICE
CERTIFICATE OF CORRECTION

PATENT NO. : 7,643,011 B2  Page 1 of 1
APPLICATION NO. : 11/619584
DATED : January 5, 2010
INVENTOR(S) : O'Connor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 528 days.

Signed and Sealed this

Twenty-first Day of December, 2010

David J. Kappos
*Director of the United States Patent and Trademark Office*